M. T. RIDOUT.
HARVESTER.

No. 172,173.

Patented Jan. 11, 1876.

Witnesses:
Donn Twitchell
Will W. Dodge

Inventor:
Moses T. Ridout
By his Attys.
Dodge & Son

UNITED STATES PATENT OFFICE.

MOSES T. RIDOUT, OF ROCHESTER, MINNESOTA, ASSIGNOR TO ASA S. CLARK AND THOMAS H. TITUS, OF SAME PLACE.

IMPROVEMENT IN HARVESTERS.

Specification forming part of Letters Patent No. 172,173, dated January 11, 1876; application filed September 20, 1875.

*To all whom it may concern:*

Be it known that I, MOSES T. RIDOUT, of Rochester, in the county of Olmsted and State of Minnesota, have invented certain Improvements in Harvesting-Machines, of which the following is a specification:

My invention consists in the combination of a frame movable vertically on the axle with chains passing from the latter under guides on the frame to a take-up shaft or drum operated by a crank or lever.

The object of my invention is to produce a strong and simple arrangement which will admit of the frame of the machine being easily and quickly raised and lowered while in the field; and to this end it consists in so arranging the axles of the supporting-wheels that they can move vertically in the frame, and connecting to their ends chains which are passed under guides on the frame to give the latter support, and thence to a take-up shaft or drum which is provided with a crank or handle and with a locking device. The essential feature of the invention is sustaining the frame by chains passing from the adjustable axles to a take-up device, and so long as this feature is retained the details may be modified as desired, although I prefer to employ the arrangement represented in the accompanying drawing, and hereinafter described. The wheel may be arranged to turn upon its axle, and the ends of the latter arranged to slide in or on a suitable guide, or the axle secured to the wheel and mounted in boxes held in guides. The chains extending down from the end of the axle or its boxes may be passed under bearings of any suitable construction on the bottom of the frame, but it is considered best to employ rollers for the purpose in order to lessen the friction and reduce the labor of raising the frame to a minimum. There may be a separate take-up shaft for the chains of each wheel, or, when the construction of the machine will permit, a single long shaft to take up all the chains. The shaft may be provided with a ratchet-wheel, and held by a pawl or other ordinary devices employed for holding the shaft or chain.

Figure 1:
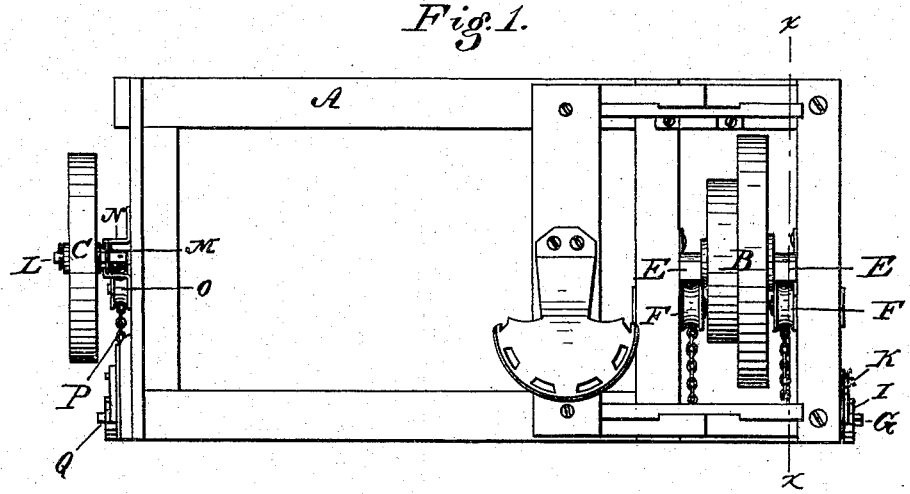
Figure 3:
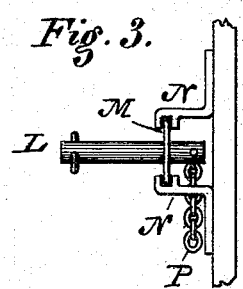
Figure 2:
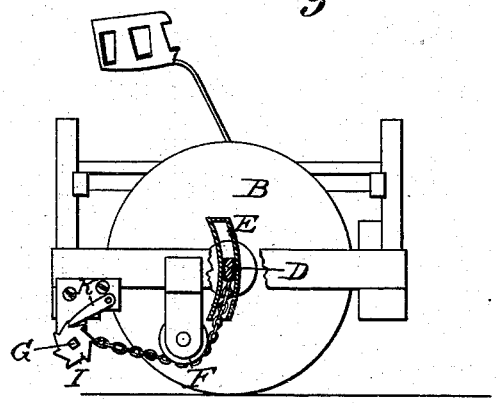
Figure 4:
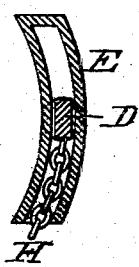

In the drawings, Figure 1 represents a top-plan view of a harvester containing my improvements; Fig. 2, a vertical section of the same on the line *x x*; Fig. 3, a plan view on an enlarged scale of the axle for the outer wheel and the guides in which it is mounted; Fig. 4, a vertical section through one end of the main shaft and its guide.

The drawings represent a machine having a rigid rectangular frame with a supporting-wheel at each end, as in the well-known Marsh harvester, but my improvements are applicable to all machines, whatever their form, which require a vertical adjustment of the frame. A represents the rigid main frame; B, the main driving and supporting wheel at the inner end of the frame; and C, the supporting-wheel at the outer end. D represents the axle of the main wheel, passed loosely through the wheel so that the latter may turn freely thereon. E E are two grooved guides, secured to the frame in vertical position to receive the ends of the axle D, which are flattened and fitted in the guides in such manner that they can slide freely up and down therein. F F are two pulleys secured to the under side of the frame, one at the lower end of each guide E, as shown in Figs. 1 and 2. G is a shaft mounted in bearings on the under rear side of the frame, behind the pulleys F. This shaft will have its end squared or otherwise adapted to receive a crank or lever or other operating device, which may be detachable or not, as preferred. H are two chains attached to the ends of the axle D, and passed thence under the pulleys F to the shaft G, to which they are firmly secured. I is a ratchet-wheel secured upon the shaft G, and K is a pawl attached to the frame and engaging with the ratchet-wheel for the purpose of holding the shaft and chains. L is the axle of the outer wheel C, upon which the wheel rotates. M is a vertical plate or slide secured to and supporting the axle L, as clearly shown in Fig. 3. N N are vertical grooved guides secured to the outer end of the main frame for the purpose of receiving and holding the axle-plate M, as shown. O, P, and Q are, respectively, a pulley, chain, and take-up shaft, arranged in the same manner as those at the inner end of the frame, except that, instead of there being two chains attached to the ends of the axle, there is a single chain only attached to the plate M.

With the various parts arranged in the manner above described, it will be observed that the entire weight of the frame is received upon the chains, and that, by simply turning the take-up shafts and thereby varying the length of the chains, the frame may be quickly raised and lowered as may be required.

The guides in which the axles move may be straight or curved, as the construction of the machine in other respects may render best.

Having described my improvements, what I claim is—

1. The combination, in a harvesting-machine, of a frame movable vertically on the axle of a supporting-wheel, and a chain or chains passing from the axle under a guide or guides on the frame to a take-up shaft or its equivalent, substantially as shown and described.

2. The combination of the main frame, provided with vertical guides, the supporting-wheel having its axle held by said guides, the pulley or pulleys and the take-up shaft secured to the frame, and the chain or chains extending from the axle under the pulleys to the shaft.

3. In combination with the main frame and its vertically movable axles, the pulleys, chains, take-up shafts, ratchet-wheels, and pawls, arranged as shown, for the purpose of permitting a vertical adjustment of the frame.

MOSES T. RIDOUT.

Witnesses:
O. O. BALDWIN,
ASA S. CLARK.